United States Patent
Gala (10) Patent No.: US 8,359,221 B2
(45) Date of Patent: Jan. 22, 2013

(54) SYSTEMS AND METHODS FOR PERSONNEL MONITORING AND MANAGEMENT

(76) Inventor: Mitesh Gala, Los Alamitos, CA (US)

( * ) Notice: Subject to any disclaimer, the term of this patent is extended or adjusted under 35 U.S.C. 154(b) by 323 days.

(21) Appl. No.: 12/794,615

(22) Filed: Jun. 4, 2010

(65) Prior Publication Data

US 2010/0312606 A1     Dec. 9, 2010

Related U.S. Application Data

(60) Provisional application No. 61/184,230, filed on Jun. 4, 2009.

(51) Int. Cl.
*G06Q 10/00* (2012.01)
(52) U.S. Cl. .............. 705/7.16; 705/7.15; 705/7.17; 705/7.21; 705/7.26
(58) Field of Classification Search ......... 705/7.11–7.42
See application file for complete search history.

(56) References Cited

U.S. PATENT DOCUMENTS

| | | | |
|---|---|---|---|
| 7,571,111 B2 * | 8/2009 | Ahrens et al. | 705/7.42 |
| 7,945,468 B1 * | 5/2011 | Bernasconi et al. | 705/7.13 |
| 2002/0040313 A1 * | 4/2002 | Hunter et al. | 705/9 |
| 2004/0093256 A1 * | 5/2004 | Garcia et al. | 705/9 |
| 2005/0273381 A1 * | 12/2005 | Thomas | 705/11 |
| 2006/0095315 A1 * | 5/2006 | Ano et al. | 705/11 |
| 2007/0063014 A1 * | 3/2007 | Plumb et al. | 235/377 |
| 2008/0046305 A1 * | 2/2008 | Garcia et al. | 705/9 |

* cited by examiner

*Primary Examiner* — David Rines
(74) *Attorney, Agent, or Firm* — Knobbe, Martens, Olson & Bear, LLP (57) ABSTRACT

The systems and methods for providing an integrated means for monitoring, managing and auditing employees performance at a workplace or job site, such as monitoring the time worked by the employees, ensuring employee compliance with applicable laws and regulations, and coordinating and assigning duties to be performed by the employees. Each employee may be provided with a mobile wireless device in communication with the system to provide alerts of potential or actual violations, notifications of any change in duties or position, and notification of time clock status (i.e., time to take a break, time to clock in, etc.).

15 Claims, 11 Drawing Sheets

Dashboard
Headers

0 – Current Violation Condition

610

- Blinks and shows violation type.
- If there is more than one violation the violation will scroll through each violation by changing the message every X seconds 1 – Alert

1120

- Solid color – shows remaining minutes until the alert will become a violation

2 – Warning

630

- Solid color – no dynamic message

3 – OK

640

- Solid color – no dynamic message

Available Columns
Columns can be selected / unselected in setup. Columns can be sorted by touching column header label
*In/Out Status*
*Name*
*Department*
*Position*
*Schedule*
*Business Rules* (definable: Break, OT, Minor, EOS, etc) (note: EOS means "end of shift – the time that the employee needs to clock out per the schedule)

FIG. 6

Buttons
Reports – goto reports and gauges screen
Clock – goto clock in/ clock out screen

Visual Indicators

Button Images can be changed / substituted by customer.

| Graphic | Indicator |
|---|---|
| In/Out Status | |
| ● | On the floor (i.e. Clocked In) |
| ◐ | Out on Break (i.e. Clocked Out) |
| Business / Labor Rule Status | |
|  | Employee is not eligible for violating this rule (ex. Employee is not eligible for break because they are not working more than 5 hrs) |
|  | Employee is not in danger of violating this rule at this time (ex. An employee will not go into overtime for > 1 hour) |
| ! | Employee is approaching the time threshold where a rule violation will occur. (ex. An employee will enter overtime in < 1 hr but > 30 minutes) |
|  | Employee has entered a dangerous period of time where if action is not taken witin the displayed amount of time a rule violation will occur. (ex. In < 15 minutes the employee will start accruing overtime unless they clock out) |
| X | Employee is currently violating the rule. (ex. The employee is incurring overtime) Note: this button flashes. |
|  | Employee violated the rule but completed the action. (ex. An employee violated the break rule causing a break exception but later took a break. The violation can not be removed because even though the break was taken the company will still have to pay the penalty. |
| ✓ | The rule was not viloated because the business profcess was completed on time. |
| Blank (no icon) | The rule does not apply. (ex. A minor law rule is not applicable for the employee because she is not a minor) |
| Schedule Status | |
| ☺ | The employee is conforming to the schedule. (ex. They did not clock in early/late (more than x minutes), they did not incur OT, or violate any other business rule) |
| ☹ | The employee is not conforming to the schedule. (ex. They did clock in early/late, or they have incured OT, or violated some other business rule) |
| 😐 | The employee is not conforming to the schedule but the infractions are not severe. (ex. They did not clock in early/late (more than y minutes), etc. |

FIG. 7

Dashboard (Main Clock Screen)

SYSTEMS AND METHODS FOR PERSONNEL MONITORING AND MANAGEMENT

CROSS-REFERENCE TO RELATED APPLICATIONS

This application claims the benefit of U.S. Provisional Application No. 61/184,230 filed Jun. 4, 2009, which is herein incorporated by reference in its entirety.

FIELD OF THE INVENTION

The present disclosure relates to systems and methods for monitoring and managing personnel and, more particularly, for monitoring and managing compliance with scheduling, business, and legal rules as it pertains to individual employees in the workplace.

BACKGROUND

Traditionally, time clocks, punch clocks and other mechanical or electronic timepieces have been used to assist employers in tracking the hours an employee worked. With respect to mechanical time clocks, this was accomplished by inserting a heavy paper card, called a time card, into a slot of the time clock and having the day and time information stamped directly on the card. The information collected on the time card allowed a timekeeper to have an official record of the hours an employee worked and to calculate the appropriate pay for the employee.

A significant problem with traditional time clocks is that there is no way to verify the identity of the person who is actually punching the time card and may be subject to abuse. For example, an employee may leave well before the end of his shift without punching out and have someone else punch out for him. Since traditional time clocks do not track the identity of the person actually submitting the card, there is no way to prevent against such abuses.

Biometric time clocks have been developed to address this problem. Biometric clock utilize a person's biological attributes to identify them, rather than using a card or other external device. Examples of such biological attributes include fingerprint and retinal scanning. Since these biological attributes cannot be separated from the associated person, biometric clocks are effective in reducing the types of timekeeping abuses associated with the traditional time clocks.

Both time clocks and biometric clocks, however, do not address the myriad of other employee monitoring and management issues in the work place, such as, for example, controlling the amount of overtime worked by employees, monitoring compliance with pertinent rules and regulations, and so forth. These duties are often performed by managers who supervise the employee's work. Thus, companies that have a large number of employees are required invest a significant amount of money hiring and training managers to properly supervise and manage these employees.

SUMMARY

The systems and methods disclosed herein provide for an integrated means for monitoring, managing and auditing employees performance at a workplace or job site, such as monitoring the time worked by the employees, ensuring employee compliance with applicable laws and regulations, and coordinating and assigning duties to be performed by the employees. Each employee may be provided with a mobile wireless device in communication with the system to provide alerts of potential or actual violations, notifications of any change in duties or position, and notification of time clock status (i.e., time to take a break, time to clock in, etc.).

A more complete understanding of methods and systems disclosed herein will be afforded to those skilled in the art, as well as a realization of additional advantages and objects thereof, by a consideration of the following detailed description. Reference will be made to the appended sheets of drawings which will first be described briefly.

BRIEF DESCRIPTION OF THE DRAWINGS

Throughout the several figures and in the specification that follows, like element numerals are used to indicate like elements appearing in one or more of the figures.

DETAILED DESCRIPTION OF THE PREFERRED EMBODIMENTS

Figure 1:
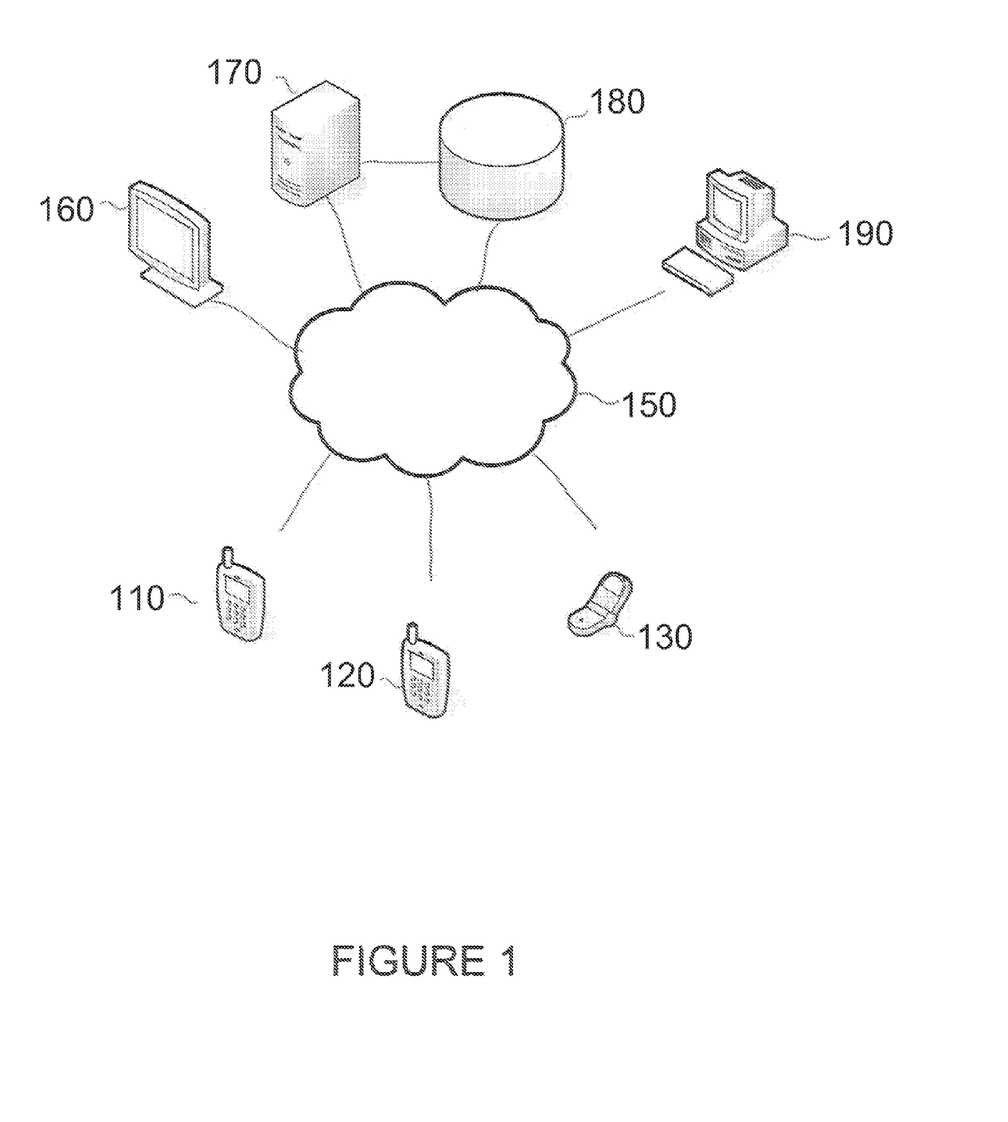
FIG. 1 is a schematic diagram showing one embodiment of a system for monitoring and managing personnel.

FIG. 1 depicts an exemplary system 100 for monitoring and managing employees at a workplace. The system comprises an employee interface 160, such as a touch screen, having an employee input device, such as a PIN pad, a card reader or a biometric reader. The employee input device may be incorporated with the touch screen or separately provided. A server 170 is in communication with both the employee interface 160 and a database 180. The database 180 may store information regarding the employees to enable the server 170 to determine whether data received from the employee input device corresponds to an active or actual employee. The database 180 may further store historical information regarding an employee, such as dates and times worked, number of hours worked, compliance history, and duties/positions performed.

A management device 190 may be in operative communication with the server 170 and may be any device capable of communicating with a computer network, such as a personal computer, a server computer, a laptop computer, a tablet computer, a personal digital assistant, a mobile phone, or a wireless communication device. The management device 190 may comprise a management application (not shown) which may be any program or application adapted to allow a user, such as, for example, an manager or supervisor, to view the data collected and stored in the database 180.

Figure 8:
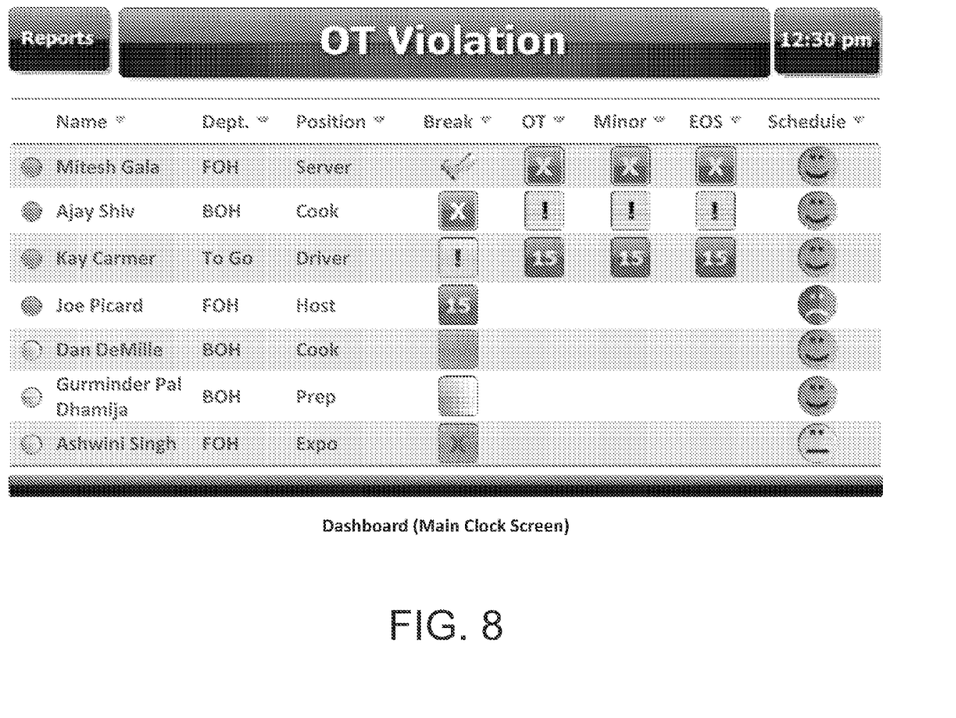
FIG. 8 is a screenshot each employee's time and compliance status in table format.

The management application may provide such data in a user-readable fashion, such as in tables. The management application may also provide functions to enable a user to sort or organize the data so as to prepare reports. For example, the management application may have a calendar function that shows each employee performance on the job over a specified time period that details the hours worked, compliance record, and duties performed. Such information provides concrete measurements of an employee's performance and is thus useful for providing performance evaluations of employees. FIG. 8 is a screenshot each employee's scheduling, performance and compliance status in table format. The screenshot may be presented at the touch screen or a management device and shows the status of each employee. It is understood that the columns in the table may be configured by a management device and may show other fields.

A plurality of mobile wireless devices, such as personal digital assistants 110, 120, and mobile telephones 130 may be provided to each employee. The mobile wireless devices 110, 120, 130 is preferably in communication with the employee interface 160, server 170 and/or management device 190 via the communication network 150 to provide alerts of potential or actual violations, schedule reminders (e.g., "time to take a 30 minute break", "time to return to work"), notification of any changes in duties or position (e.g. "please report to the fry station", "please report to the manager"), etc. The mobile device 110, 120, 130 may be specifically configured for use in connection with the system 100. Alternatively, mobile device 110, 120, 130 may simply be a mobile telephone, such as an iPhone, having an application which enables the mobile telephone to communicate with the system 100.

Mobile devices 110, 120, 130, employee interface 160, server 170, database 180, and management device 190 may be in communication with one another via a network 150. The network 150 may comprise the Internet, a cellular communications network, a satellite communications network, a radio communications network, a wide area network, a personal area network, a local area network, or a combination of these or other suitable networks.

Figure 2:
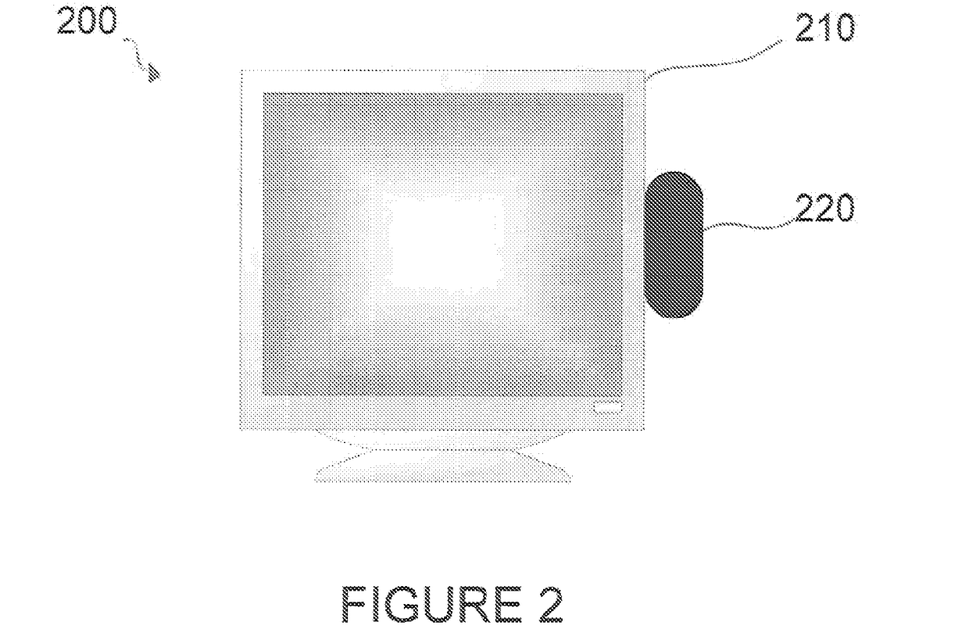
FIG. 2 depicts one embodiment of an employee interface featuring a card reader.

FIG. 2 shows one embodiment of an employee interface 200 featuring a touch screen 210 and an associated card reader 220. The touch screen 210 may be activated upon swiping an employee card through the card reader 220. The card reader 220 may be a magnetic stripe reader, a bar code reader, a proximity reader, a smart card or a smart card reader.

Data from the employee card is read by the card reader 220 and transmitted to a processor which ascertains the identity of the employee and determines whether access to the functions of the employee interface 200 is to be granted. If access is to be granted, the touch screen 210 presents the employee with an array of relevant options.

Figure 9:
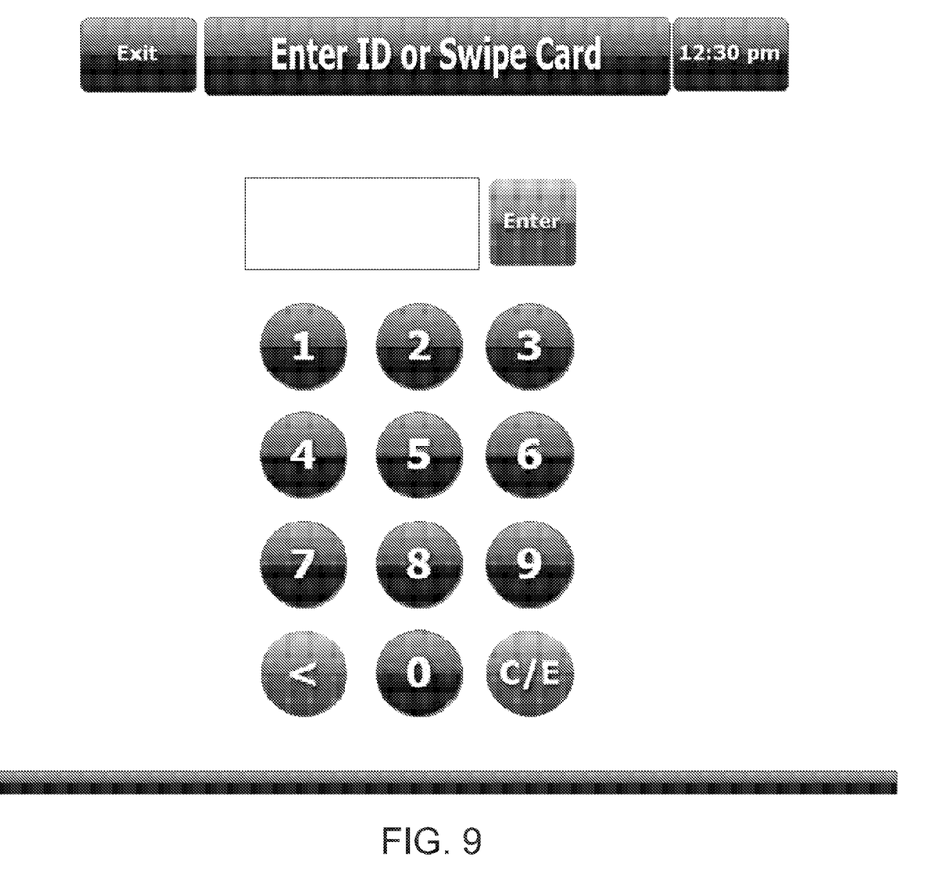
FIG. 9 is a screenshot of a touch screen employee identification input portion.

It is understood that the card reader 220 may be any device that is capable of reading a credential in determining whether to allow access to the features of the touch screen 210. Accordingly, a PIN pad, such as the one depicted in FIG. 9, may be incorporated in the touch screen in place of providing a card reader 220. The employee need only input a unique employee identification number using the on-screen pin pad.

Figure 3:
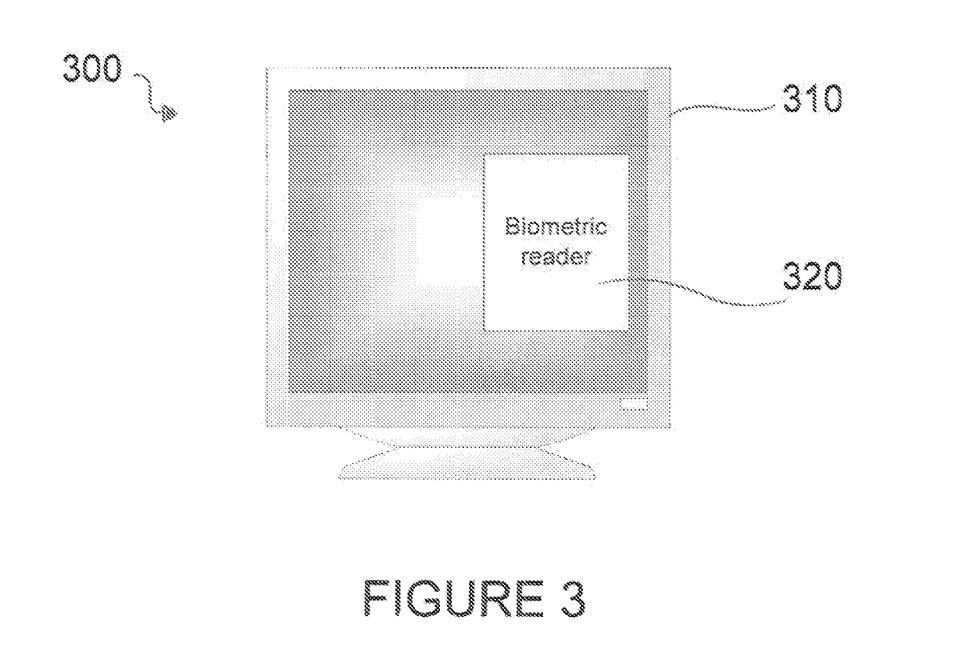
FIG. 3 depicts another embodiment of an employee interface featuring a biometric reader.

FIG. 3 shows another embodiment of an employee interface 300 featuring a touch screen 310 and a biometric identification reader 320. The employee interface 300 functions much in the same way as the one depicted in FIG. 2. The biometric identification reader 320 is advantageous in that provides higher assurances in authenticating the identity of the employee seeking to access the touch screen 310.

Biometric identification reader 320 receives a scan of the employee's biometric feature (i.e., an employee's fingerprint, handprint, hand geometry, face recognition, voice recognition, iris or retinal recognition) and compares it to a stored template. If the probability that the template in the memory and the live scan belong to the same person is high enough, the identification number of that person is sent to the touch screen 210 and the touch screen 210 then checks permissions of the employee and makes the decision whether to grant access or not. Biometric identification reader 320 significantly increases the security level of systems because it eliminates such problems as lost, stolen or loaned ID cards and forgotten or guess PINs.

Figure 4:
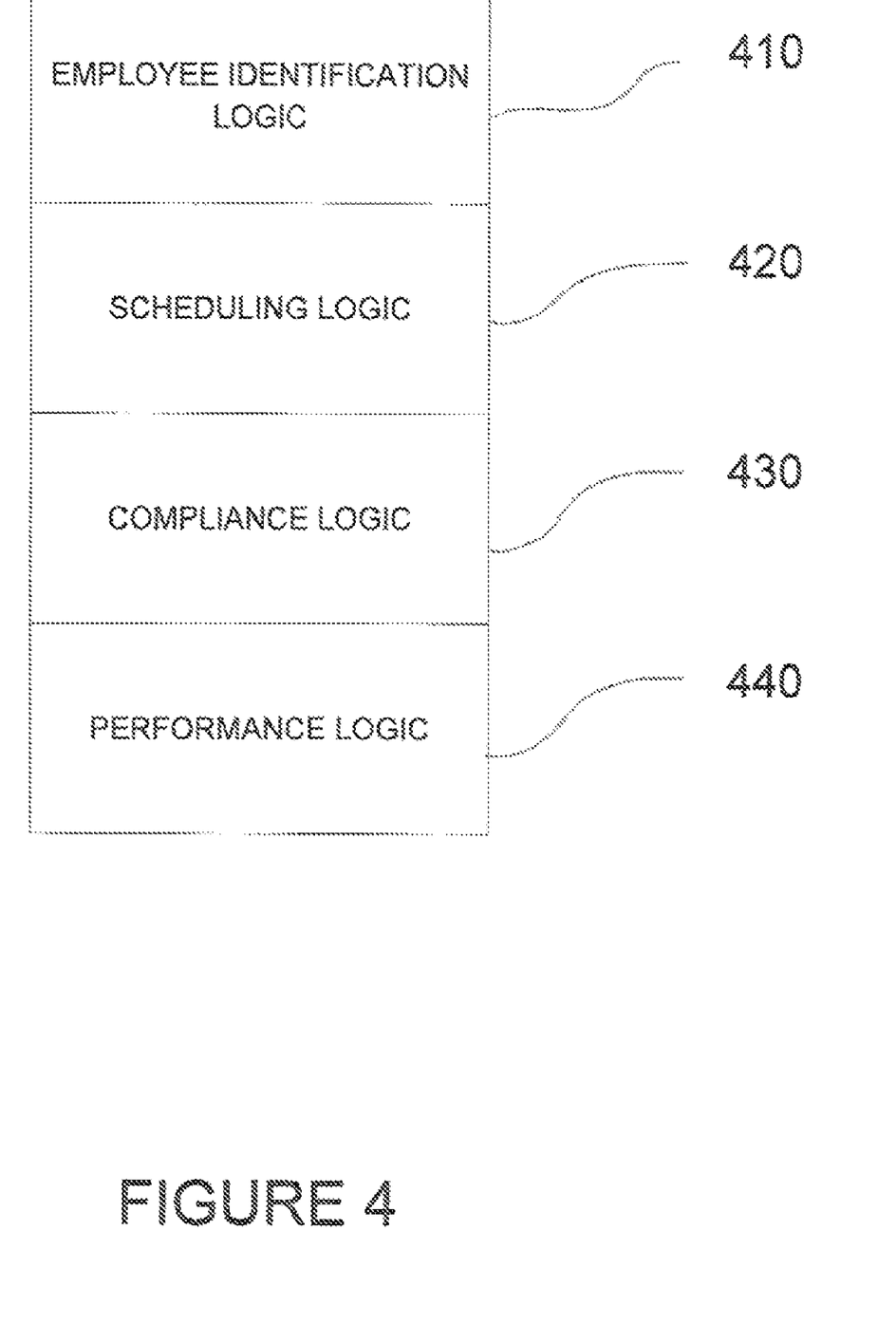
FIG. 4 is a schematic diagram showing the various modules of an embodiment of the software used in connection with the system.

FIG. 4 is a schematic diagram showing the various modules of an embodiment of the software 400 used in connection with the system. The software 400 comprises at least four modules: an employee identification logic 410, a scheduling logic 420, a compliance logic 430 and a performance logic 440. While FIG. 4 depicts the four modules as being discrete modules, it is understood that they may also have interrelations between the modules such that the certain functions of the compliance logic 440, for example, are performed in conjunction with either one or both of schedule logic 420 and the performance logic 440.

The employee identification logic 410 is configured to receive identification data and perform a comparison or analysis with stored data in determining whether or not to grant access to the system. As describe above in connection with FIGS. 2 and 3, identification data may be provided as a magnetic strip on an access card or biometric data that is read by a biometric reader. Employee identification logic 410 accesses stored employee data and conducts a comparison to determine whether a match is found with the stored employee data.

Employee identification logic 410 may comprise additional functionalities, such as the ability to enable or lock out an employee from all devices and computers from a workplace. This may be useful in instances in which immediate action is required to lock out an employee from accessing the system, such as when an employee is determined to be a security risk. The employee identification logic 410 may communicate with other associated devices and computers in the network to lock that employee from having access to all systems, devices and computers. As will be described in further detail below, employee identification logic 410 may also control an employee's access to various devices and computers in less drastic situations, based on the employee's compliance, schedule, or performance status.

Scheduling logic 420 performs the necessary timekeeping determinations and calculations. For example, scheduling logic 420 records the time that an employee reports to work when the employee clocks in, the hours the employee has been working, the number and duration of breaks taken, the amount of overtime worked, and so forth. Upon the determination by the employee identification logic 410 to grant access to an employee, the scheduling logic 420 determines the status of the employee and provides the relevant options to the employee, such as clock-in, break start, break end, clock out, etc.

Figure 10:
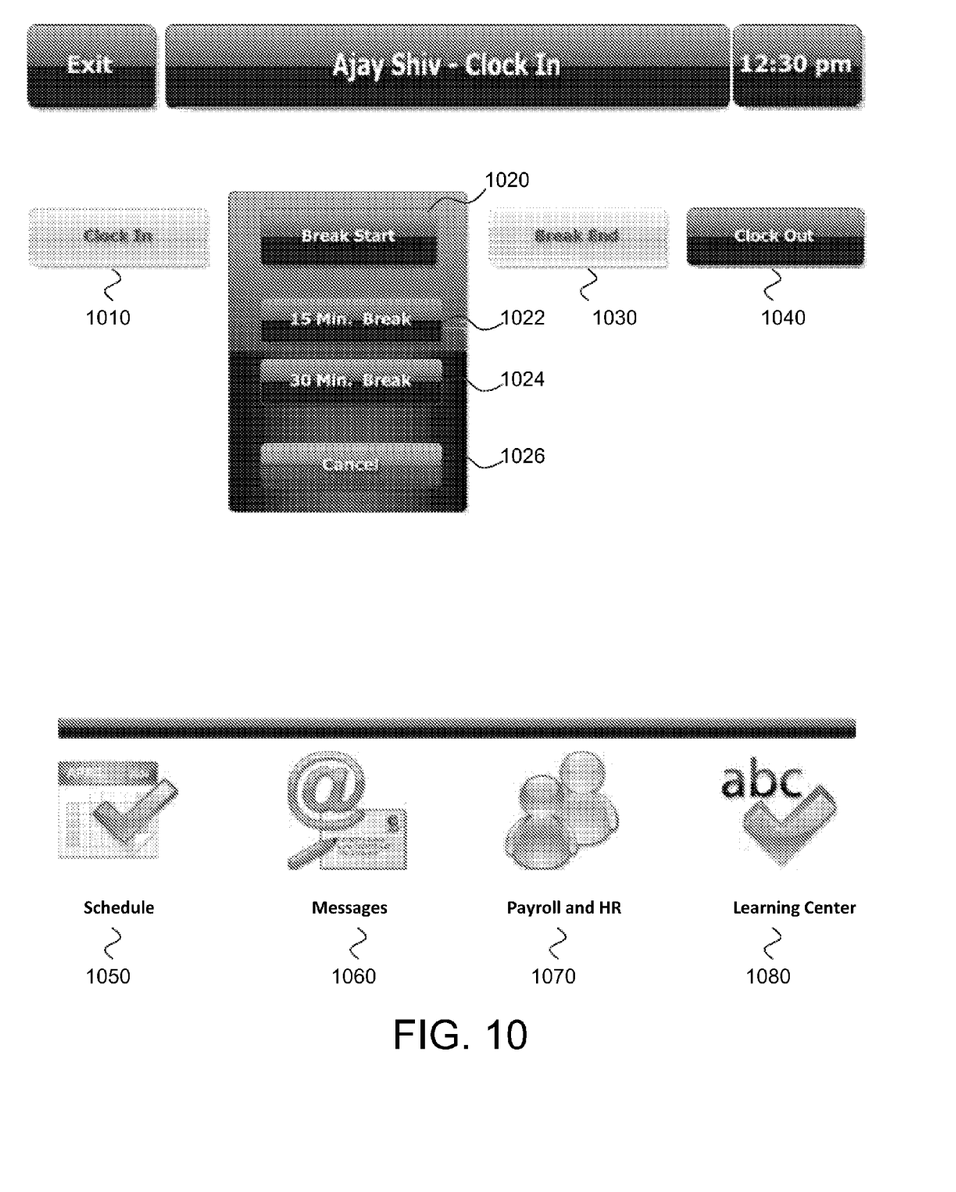
FIG. 10 is a screenshot of a touch screen showing various features upon clock in by an employee.

FIG. 10 depicts a screenshot of a touch screen showing various features upon clock in by an employee. As shown in FIG. 10, once an employee clocks in, available choices, such as Break Start 1020, 15 Min. Break 1022, 30 Min. Break 1024, Cancel 1026, and Clock Out 1040 may be presented in a color different from the unavailable choices, such as Clock In 1010, Break End 1040. As depicted in FIG. 10, the touch screen may provide additional functionalities for the employee, such as looking up his work schedule 1050, view or send messages 1060, payroll and HR information 1070, and a Learning Center 1080 which may provide training or other education resources to the employee. In one embodiment, the system may require the employee to view a mandatory training video as a condition to completing the Clock In process.

Compliance logic 430 performs the functions to determine whether an employee is in compliance with applicable laws, regulations or rules. Applicable laws may include federal and state labor and employment laws, which may regulate the number of hours an employee may work per day or week in a particular field or vocation, required break and lunch breaks, limitations on the amount of overtime worked, etc. In addition, compliance logic 430 may also take into consideration union and other workplace regulations and rules. Compliance logic 430 is therefore tailored to the jurisdiction and the requirements of a particular workplace or job site.

Scheduling logic 420 and compliance logic 430 may cooperate to direct an employee's options. For example, if an applicable law requires employees to take a 30 minute break after working 5 hours, the scheduling logic 420 and compliance logic 430 may keep track of an employee's status and send an alert to the employee via the mobile device to take a break. The employee will not be able to end the break or clock back in until after 30 minutes has elapsed.

Thus, the relevant options determined by the scheduling logic 420 may be made in cooperation with the compliance logic 430 and the performance logic 440. For example, if the scheduling logic 420 determines that the last access from the employee was a "break start", the options available to the employee upon the next access may be "break end" or a "clock out". If an applicable law requires an employee to take a minimum break of 30 minutes, the compliance logic disables the "break end" feature until 30 minutes have elapsed from the time when the employee selected the "break start" feature.

Figure 6:
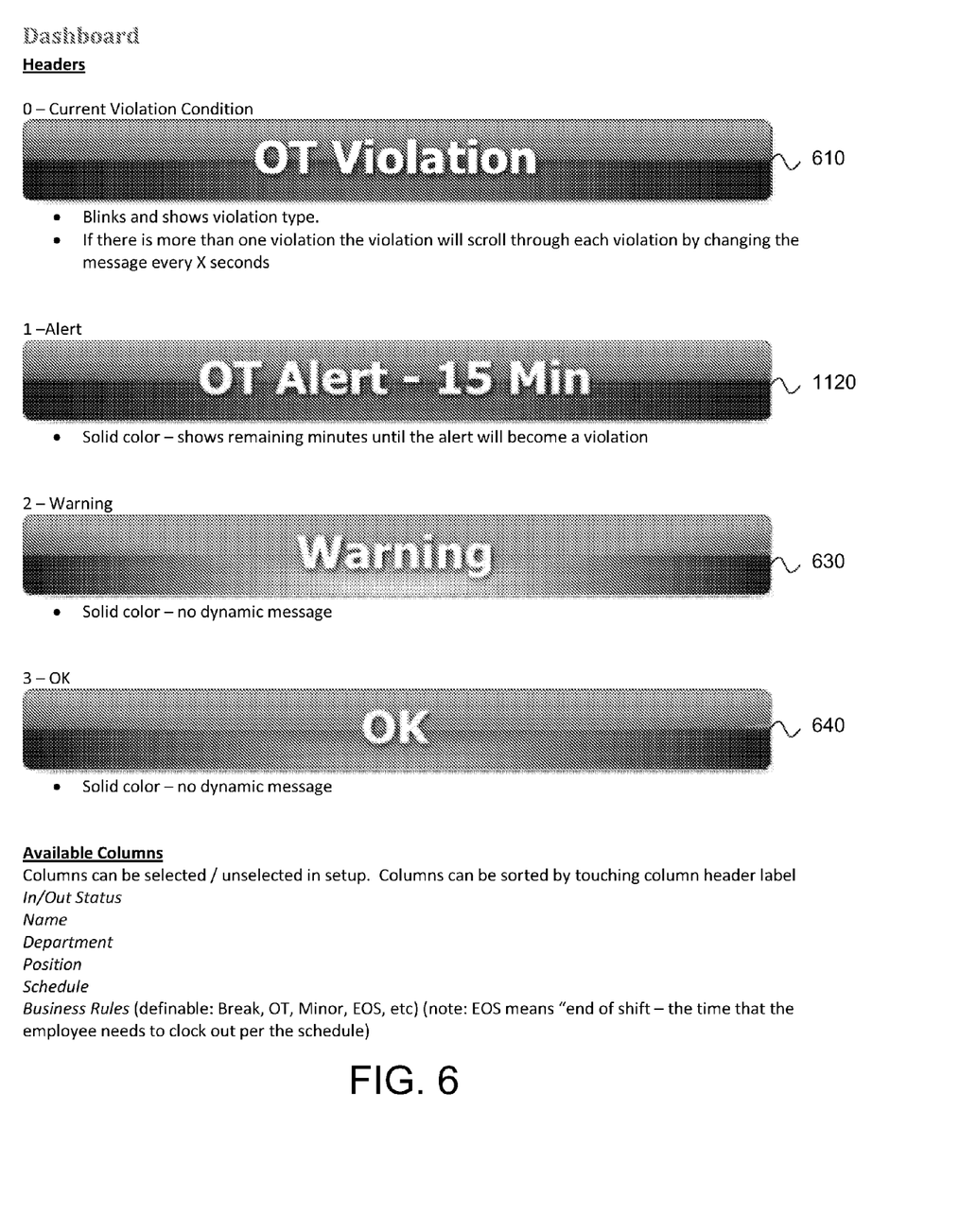
FIG. 6 depicts real-time alerts in connection with an employee's time status.

FIG. 6 depicts exemplary status bars that may be issued by the scheduling logic 420 on either the touch screen or the employee's mobile device. The status bars may be color coded based on the severity of a potential or actual violation. An actual or impending violation indicated by red colored status bars, 610, 620. Warnings may be indicated by a yellow colored status bar 630. If no violations or potential violations are detected, then a green colored "OK" status indicator 640 may be provided. These warnings may be displayed at the touchscreen or the individual employee's mobile devices.

Figure 7:
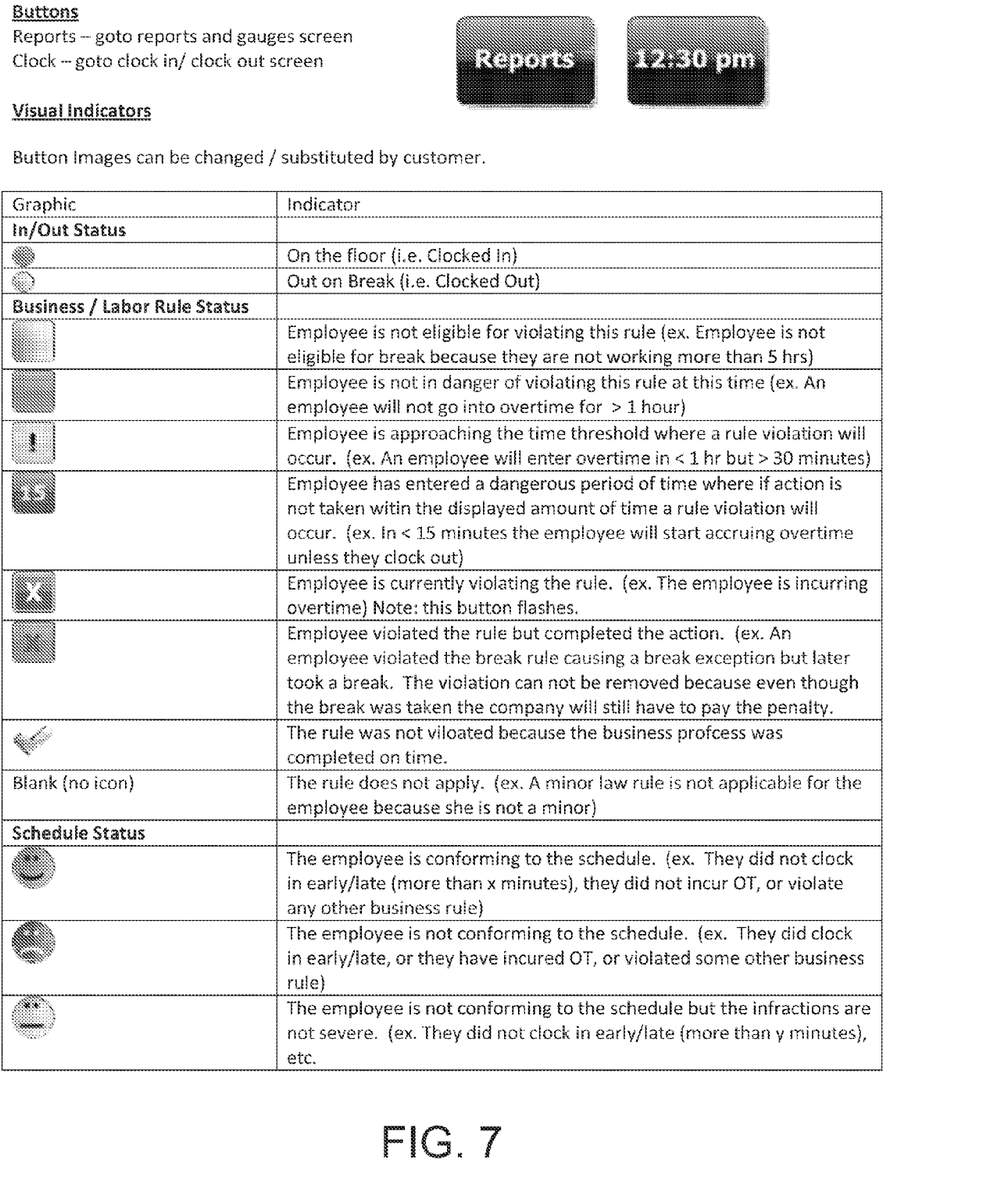
FIG. 7 depicts the various graphics and associated messages which may be used in connection with the display of an employee's time status.

FIG. 7 depicts the various graphics and associated messages which may be used in connection with the display of an employee's compliance and time status. The graphics may further be color coded to show a level of violation, warning or status. Each of these graphics may be provided in connection with an employee for a quick reference as to the current status of the employee.

Performance logic 440 performs the functions to determine the appropriate tasks, duties or positions assigned to the employee. For example, in a restaurant setting, an employee may be responsible for a number of different duties, such as prep work, food preparation, cash register, waiting tables, etc. Performance logic 440 may therefore be configured to keep track of the various duties assigned to the employees and reassign employee duties as necessary.

Thus, an employee may clock in and receive a message directing the employee to report to the prep station. While the employee is working in the prep station, the system may send a notification to the employee's mobile device instructing the employee to report to the food prep station. Performance logic 440 accomplishes the coordination of personnel and assignment of duties typically performed by an onsite manager or supervisor. Performance logic 440 also takes in to consideration an employee's availability or available time. For example, performance logic 440 does not assign further duties to an employee who is on break or is in danger of working overtime.

Figure 11:
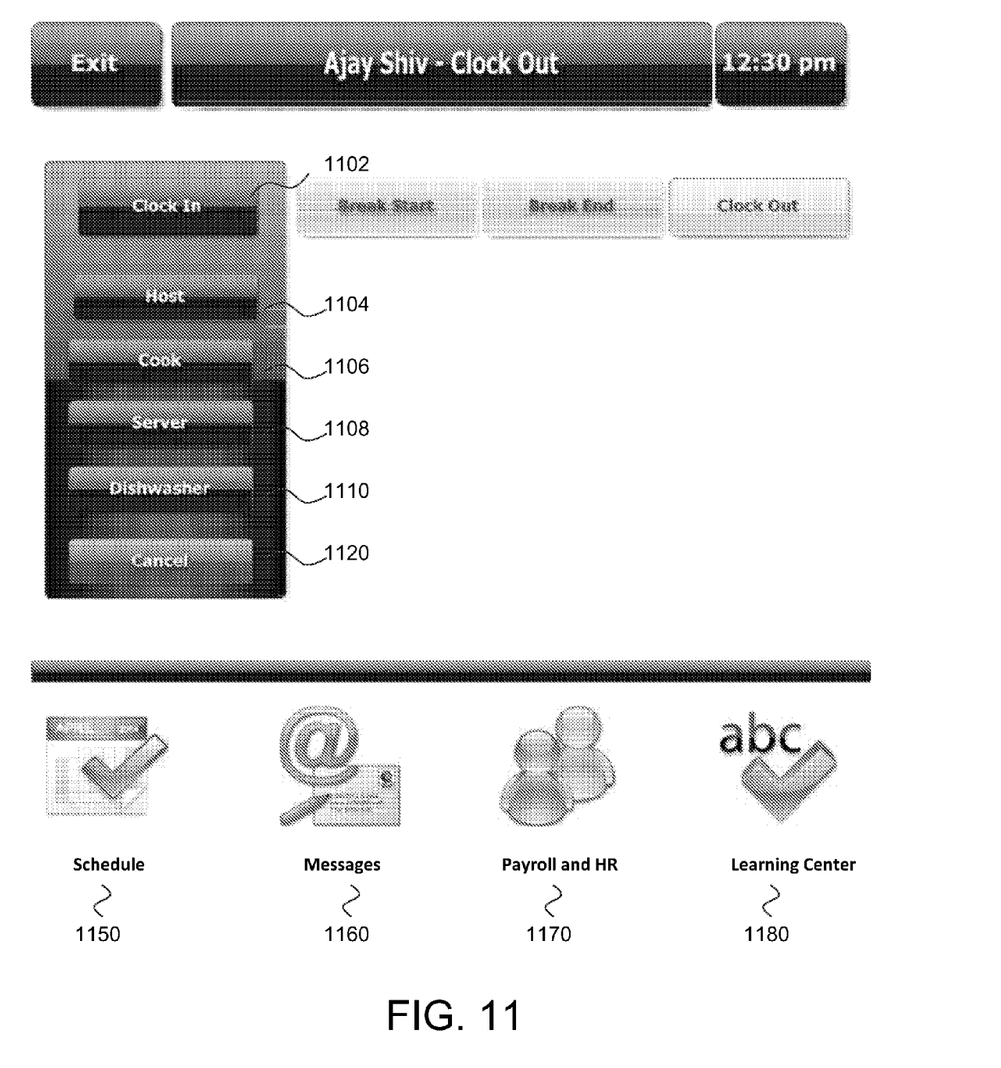
FIG. 11 is a screenshot of a touch screen showing various features.

FIG. 11 is a screenshot depicting available options to an employee based on the operation of both the scheduling and performance logic. As shown in FIG. 11, an employee is given the option to clock in 1102 and report to Host 1104, Cook 1106, Server 1108 or Dishwasher 1110 duties. An employee may cancel his selection by selecting the Cancel 1120 button and start anew. In a preferred embodiment, the touch screen may provide additional functionalities for the employee, such as looking up his work schedule 1150, view or send messages 1160, payroll and HR information 1170, and a Learning Center 1180 which may provide training or other education resources to the employee.

Figure 12:
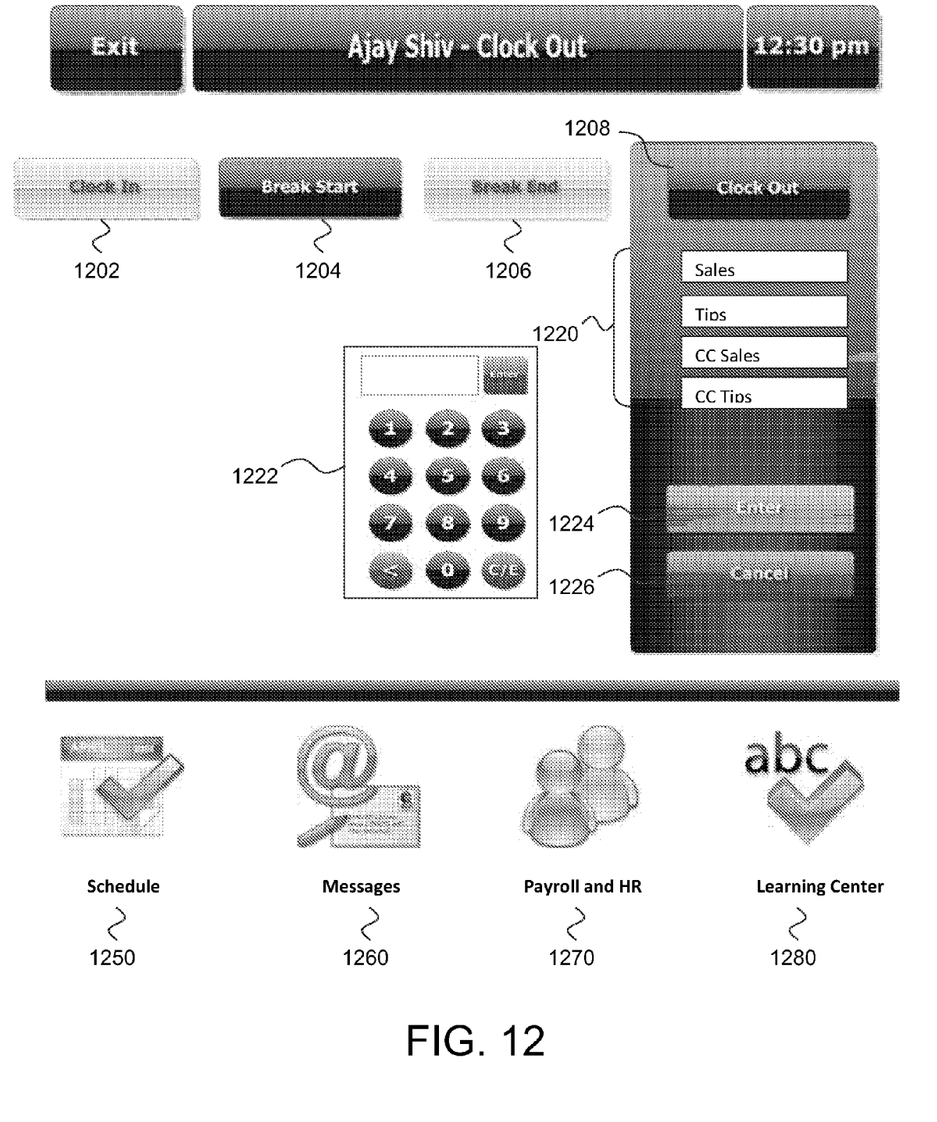
FIG. 12 is another screenshot of a touch screen showing various features.

FIG. 12 is a screenshot of a touch screen showing various features upon a clock in by an employee. Since the employee has already clocked in, the Clock In 1202 and Break End 1206 options are not available and the Break Start 1204 and the Clock Out 1208 are available for selection. Further depicted in connection with the Clock Out 1208 option are additional fields that need to be completed. Again, the appropriate fields are configurable based on the work environment and FIG. 12 depicts exemplary fields in the context of a restaurant. The employee must input information in the Sales, Tips, CC Sales CC Tips fields 1220 to complete the Clock Out 1208 process. A calculator 1222 may be provided to assist the employee in making appropriate calculations. Upon completing the mandatory fields, the employee may select Enter 1224 or Cancel 1226 to start the data input anew.

A significant advantage to requiring an employee input information in specified fields as a condition to clocking out is that it provides further controls and monitoring over the employee's activities. For example, in the restaurant context, rules may be in place as to tip reporting, e.g., that each employee's reported tip be at least 8% of cash sales. Once the employee completes the clock out process, the system may communicate with other devices and computers in the restaurant, such as cash registers and order systems, to log that employee out and prevent the employee from having further access to the systems without first clocking in.

Figure 5:
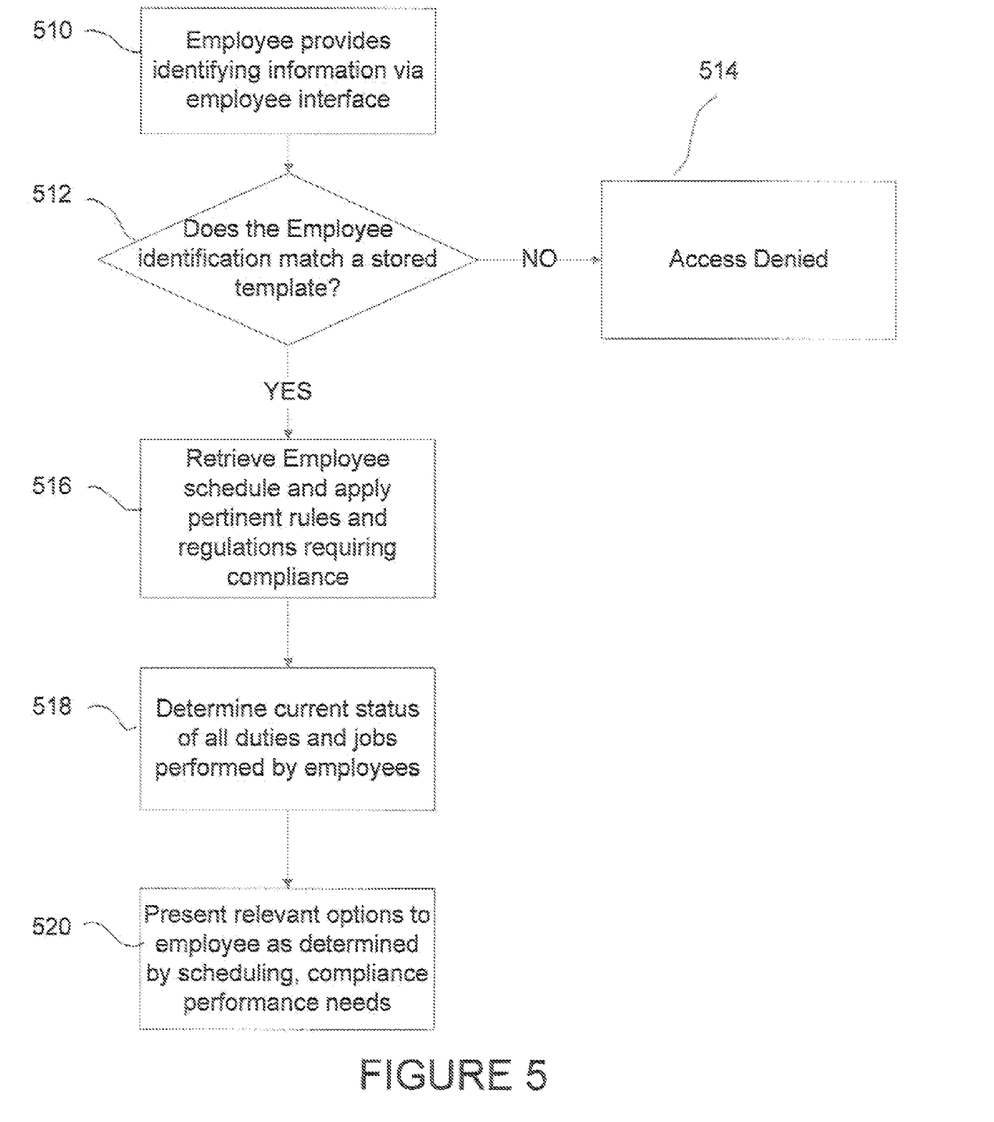
FIG. 5 is a flow chart showing an exemplary process for monitoring and managing personnel.

FIG. 5 is a flow chart showing an exemplary process for monitoring and managing personnel. At 510, the employee provides identifying information via the employee interface (e.g., PIN, magnetic card or biometric information). At 512, a determination is made as to whether or not the identifying information supplied by the employee matches a stored template. If a match is not found, then at 514, a message is displayed on the interface that access is denied.

If a match is found, then at 516, then the employee schedule is retrieved and the relevant rules which guide compliance with applicable laws and regulations are applied. At 518, an additional assessment is made to determine the current status of all duties and jobs being performed by all employees in the workplace. Based on the employee schedule, the relevant rules with which the employee must comply with, and the current status of employees on the floor, at 520, relevant options are presented to the employee.

For example, if the employee is checking in for the first time, such options may include CHECK IN and a selection or instruction to report to a particular duty or station. Once the employee reports to the appropriate duty or selection, a mobile device which the employee continues to further update the employee as to applicable warnings and instructions.

While the present invention has been illustrated and described with particularity in terms of preferred embodiments, it should be understood that no limitation of the scope of the invention is intended thereby. Features of any of the foregoing methods and devices may be substituted or added into the others, as will be apparent to those of skill in the art. It should also be understood that variations of the particular embodiments described herein incorporating the principles of the present invention will occur to those of ordinary skill in the art and yet be within the scope of the invention.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

It is understood that the specific order or hierarchy of steps in the processes disclosed herein in an example of exemplary approaches. Based upon design preferences, it is understood that the specific order or hierarchy of steps in the processes may be rearranged while remaining within the scope of the present disclosure. The accompanying method claims present elements of the various steps in sample order, and are not meant to be limited to the specific order or hierarchy presented.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical discs (e.g., compact disc (CD), digital versatile disc (DVD), etc.), smart cards, and flash memory devices (e.g., Erasable Programmable Read Only Memory (EPROM), card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

What is claimed:

1. A computer system for monitoring and managing an employee at a workplace, the computer system comprising:
   an electronic memory storage configured to store modules;
   a computer processor configured to execute the modules comprising:
      an employee identification module configured to receive employee identification data, perform a comparison of the received employee identification data with stored credential data of the employee, and determine whether or not to grant the employee access to the system;
      a scheduling module configured to receive time data from the employee related to an employee clock-in time and an employee clock-out time, wherein the employee clock-in time indicates an employee start time for working and the clock-out time indicates an employee stop time for working; and
      a compliance module configured to access applicable regulations from a regulations database, the compliance module further configured to determine whether the employee is in compliance with the applicable regulations, wherein the applicable regulations comprise a frequency of breaks and a length of breaks required,
      wherein the scheduling module and compliance module are further configured to communicate with each other to determine whether the employee is required to take a break at a point in time based on the received time data and applicable regulations,
      wherein the scheduling module, based on the determination that the employee is required to take a break, is further configured to electronically transmit an alert to the employee to take a break,
      wherein the scheduling module, based on the determination that the employee is required to take a break, is further configured to automatically record a clock-out time and prohibit the employee from entering a clock-in time for a duration of the required break.

2. The computer system claim 1, wherein the employee identification module is configured to receive employee identification data from at least one of: a touch screen, a card reader, a key pad, a biometric identification device, or combinations thereof.

3. The computer system of claim 1, wherein the applicable regulations comprises government workplace regulations.

4. The computer system of claim 1, wherein the applicable regulations comprises business rules.

5. The computer system of claim 1, wherein the applicable regulations comprises government workplace regulations and business rules.

6. The computer system of claim 1, further comprising a performance module configured to assign additional tasks to the employee based on the determination that the employee is not required to take a break.

7. The computer system of claim 6, wherein the performance module is further configured not to assign additional tasks to the employee based on the determination that the employee is required to take a break.

8. The computer system of claim 1, further comprising a display module configured to graphically present on a display hardware to a manager whether the employee is in compliance with the applicable regulations.

9. The computer system of claim 1, further comprising a display module configured to graphically present on a display hardware whether a plurality of employees are in compliance with the applicable regulations.

10. The computer system of claim 1, further comprising a display module configured to graphically present on a display hardware to the employee whether the employee is in compliance with the applicable regulations.

11. The computer system of claim 1, wherein the scheduling module, based on the determination that the employee is required to take a break, is further configured to electronically transmit an alert to a user that the employee is required to take a break.

12. The computer system of claim 11, wherein the alert is a visual alert.

13. The computer system of claim 11, wherein the alert is an audible alert.

14. The computer system of claim 1, wherein the scheduling module and compliance module are further configured to communicate with each other to determine when the employee is required to take a break at a point in time based on the received time data and applicable regulations, and wherein the scheduling module is further configured to electronically transmit an alert to a user that a required break is approaching.

15. The computer system of claim 1, wherein the computer system comprises one or more computing devices.

* * * * *

UNITED STATES PATENT AND TRADEMARK OFFICE
CERTIFICATE OF CORRECTION

PATENT NO.         : 8,359,221 B2                                   Page 1 of 1
APPLICATION NO.    : 12/794615
DATED              : January 22, 2013
INVENTOR(S)        : Mitesh Gala It is certified that error appears in the above-identified patent and that said Letters Patent is hereby corrected as shown below:

In the Drawings:

Sheet 6 of 11 (FIG. 7) at line 18, Change "witin" to --within--.

Sheet 6 of 11 (FIG. 7) at line 27, Change "viloated" to --violated--.

Sheet 6 of 11 (FIG. 7) at line 27, Change "profcess" to --process--.

Sheet 6 of 11 (FIG. 7) at line 35, Change "incured" to --incurred--.

In the Claims:

In column 8 at line 50, In Claim 2, change "system" to --system of--.

Signed and Sealed this
Thirtieth Day of July, 2013

Teresa Stanek Rea
*Acting Director of the United States Patent and Trademark Office*